United States Patent
Mishra et al.

(10) Patent No.: US 11,928,440 B2
(45) Date of Patent: Mar. 12, 2024

(54) SYSTEMS AND METHODS FOR HANDLING MULTILINGUAL QUERIES

(71) Applicant: Rovi Guides, Inc., San Jose, CA (US)

(72) Inventors: Ajay Kumar Mishra, Karnataka (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 272 days.

(21) Appl. No.: 17/001,911

(22) Filed: Aug. 25, 2020

(65) Prior Publication Data
US 2022/0067308 A1    Mar. 3, 2022

(51) Int. Cl.
*G06F 40/58* (2020.01)
*G06F 16/2452* (2019.01)
*G06F 40/263* (2020.01)
*G06F 40/47* (2020.01)
*G06F 40/51* (2020.01)

(52) U.S. Cl.
CPC ........ *G06F 40/58* (2020.01); *G06F 16/24522* (2019.01); *G06F 40/263* (2020.01); *G06F 40/47* (2020.01); *G06F 40/51* (2020.01)

(58) Field of Classification Search
CPC ............. G06F 16/24522; G06F 40/263; G06F 16/2452
See application file for complete search history.

(56) References Cited

U.S. PATENT DOCUMENTS

| | | | | |
|---|---|---|---|---|
| 2014/0012563 A1* | 1/2014 | Caskey | ................. | G06F 40/263 704/2 |
| 2014/0180670 A1* | 6/2014 | Osipova | ................. | G06V 20/20 704/3 |
| 2016/0117315 A1* | 4/2016 | Lu | ........................... | G06F 40/55 704/2 |
| 2016/0350289 A1* | 12/2016 | Zhao | ....................... | G06F 40/45 |
| 2019/0332677 A1* | 10/2019 | Farhan | .................... | G06F 40/51 |
| 2020/0226327 A1* | 7/2020 | Matusov | ................. | G06F 40/58 |

OTHER PUBLICATIONS

Felix Hill, Kyunghyun Cho, and Anna Korhonen. 2016. Learning Distributed Representations of Sentences from Unlabelled Data. In Proceedings of the 2016 Conference of the North American Chapter of the Association for Computational Linguistics: Human Language Technologies, pp. 1367-1377 (Year: 2016).*

Yunsu Kim, Jiahui Geng, and Hermann Ney. 2018. Improving Unsupervised Word-by-Word Translation with Language Model and Denoising Autoencoder. In Proceedings of the 2018 Conference on Empirical Methods in Natural Language Processing, pp. 862-868, Brussels, Belgium (Year: 2018).*

* cited by examiner

*Primary Examiner* — Richemond Dorvil
*Assistant Examiner* — Alexander G Marlow
(74) *Attorney, Agent, or Firm* — HALEY GUILIANO LLP

(57) ABSTRACT

Systems and methods for handling multilingual queries are provided. One example method includes receiving, at a computing device, an input, wherein the input comprises a multi-lingual query comprising at least a first source language and a second source language. The multi-lingual query is translated, word for word, into a destination language to produce a monolingual query, with the word order of the multilingual query and the word order of the monolingual query being the same. The monolingual query is processed using natural language processing to map the mono-lingual query to a natural language query in the destination language.

18 Claims, 6 Drawing Sheets

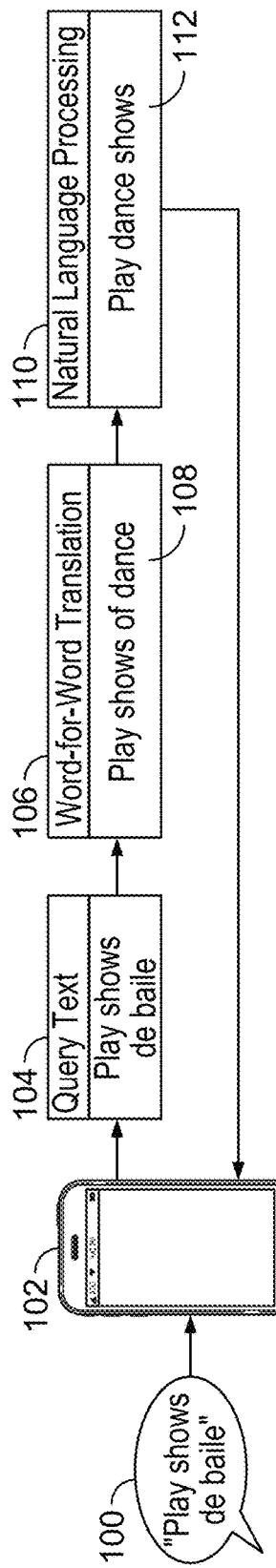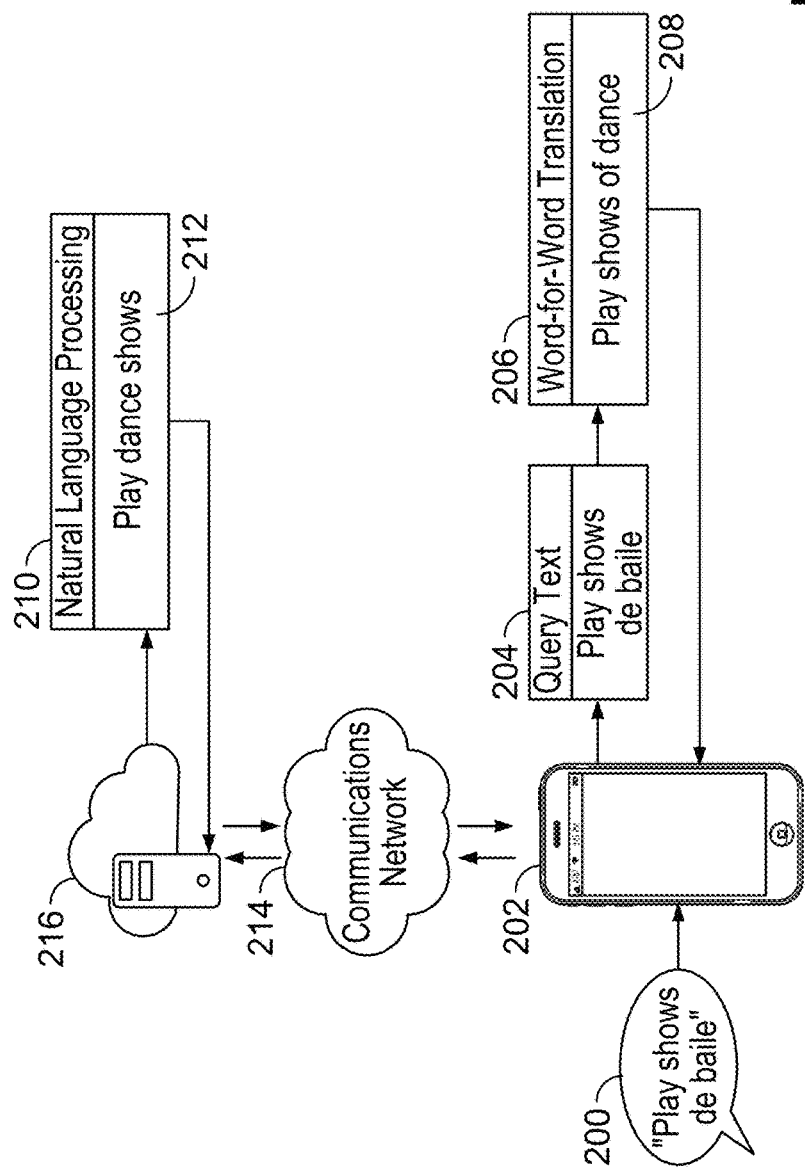
FIG. 1
FIG. 2

SYSTEMS AND METHODS FOR HANDLING MULTILINGUAL QUERIES

BACKGROUND

The disclosure relates to handling multilingual queries and, in particular, systems and related methods for utilizing a trained neural network to handle multilingual queries.

SUMMARY

With the proliferation of computing devices, such as laptops, smartphones, tablets, and smart speakers, there has been an increase in the use of systems that allow users interact with such computing devices via natural language queries. For example, if a user wanted to a computing device to play back dance shows, the user may interact with a computing device by providing the query "Play dance shows." For environments where a single language is spoken, it is relatively straightforward to train a system, such as a neural network, to determine the context of the words that make up such a query. For example, the word "play" in this context means to play something back rather than to take part in a game, and the word "play" is associated with the phrase "dance shows." However, in many environments it is common for people to use a mix of languages when providing a query. For example, a user may interact with a personal electronic device by providing the multilingual query "Play shows de baile." "Play shows" is English and "de baile" is Spanish for "of dance." As can be seen, the word order of the multilingual query is different from that of the query provided in a single language. Simply translating, word for word, the words in the multilingual query to a desired language is not satisfactory, as the word order may not reflect the word order that is typically found in the desired language. Just as a multilingual query comprises words from multiple languages, the multilingual query may also reflect the word order of multiple languages. As such, a query that has been word for word translated may not be understandable by a user and/or be correctly interpreted by a system that has been trained to respond to natural language queries. Thus, a system is needed that can handle multilingual queries in only one language.

In accordance with a first aspect of the disclosure, a method is provided for handling a multilingual query comprising two or more languages, the method comprising receiving, at a computing device, an input, wherein the input comprises a multilingual query comprising at least a first source language and a second source language; translating, word for word, the multilingual query into a destination language to produce a monolingual query, wherein the word order of the multilingual query and the word order of the monolingual query are the same; and processing the monolingual query, using natural language processing to map the monolingual query to a natural language query in the destination language. In some embodiments, the natural language query is executed at the computing device. In some embodiments, at least one of the translating and/or the processing using natural language processing is performed at the computing device. In some embodiments, the computing device communicates with a server; and the server performs at least one of the translating and/or the processing using natural language processing. In some embodiments, the natural language processing utilizes a trained network that comprises a hidden state based on word order of the destination language. In some embodiments, the input is spoken input. In some embodiments, the input is text input. In some embodiments, the computing device is a mobile device or a smart speaker.

In accordance with a second aspect of the disclosure, a system is provided for handling a multilingual query comprising two or more languages, the system comprising: control circuitry configured to: receive an input, wherein the input comprises a multilingual query comprising at least a first source language and a second source language; translate, word for word, the multilingual query into a destination language to produce a monolingual query, wherein the word order of the multilingual query and the word order of the monolingual query are the same; and process the monolingual query using natural language processing to map the monolingual query to a natural language query in the destination language. In another embodiment, the control circuitry is further configured to execute the natural language query at the control circuitry. In another embodiment, the control circuitry is further configured to perform at least one of the translating and/or the processing using natural language processing at the control circuitry. In another embodiment, the control circuitry is further configured to enable the control circuitry to communicate with a server that performs at least one of the translating and/or the processing using natural language processing. In another embodiment, the control circuitry is further configured to use natural language processing that utilizes a trained network that comprises a hidden state based on word order of the destination. In another embodiment, the control circuitry is further configured to receive spoken input. In another embodiment, the control circuitry is further configured to receive text input. In another embodiment, the system is a mobile device or a smart speaker.

In accordance with a third aspect of the disclosure, there is provided a non-transitory computer-readable medium having non-transitory computer-readable instructions encoded thereon for handling a multilingual query comprising two or more languages, the system comprising control circuitry configured to receive an input, wherein the input comprises a multilingual query comprising at least a first source language and a second source language; translate, word for word, the multilingual query into a destination language to produce a monolingual query, wherein the word order of the multilingual query and the word order of the monolingual query is the same; and process the monolingual query using natural language processing to map the monolingual query to a natural language query in the destination language. In one embodiment, execution of the instructions to handle a multilingual query comprising two or more languages further causes the control circuitry to execute the natural language query at the control circuitry. In one embodiment, execution of the instructions to handle a multilingual query comprising two or more languages further causes the control circuitry to perform at least one of the translating and/or the processing using natural language processing at the control circuitry. In one embodiment, execution of the instructions to handle a multilingual query comprising two or more languages further causes the control circuitry to enable the control circuitry to communicate with a server that performs at least one of the translating and/or the processing using natural language processing. In one embodiment, execution of the instructions to handle a multilingual query comprising two or more languages further causes the control circuitry to use natural language processing that utilizes a trained network that comprises a hidden state based on word order of the destination. In one embodiment, execution of the instructions to handle a multilingual query comprising two or more languages further causes the control circuitry to receive spoken input. In one embodiment, execution of the instructions to handle a multilingual query comprising two or more languages further causes the control circuitry to receive text input. In one embodiment, execution of the instructions to handle a multilingual query comprising two or more languages further enables the control circuitry to function as a mobile device or a smart speaker.

In accordance with a fourth aspect of the disclosure, a method is provided of training a network to handle a multilingual query comprising two or more languages, the method comprising: providing first source language data, wherein the first source language data comprises a plurality of source phrases and wherein each source phrase comprises one or more first source words; producing a mathematical representation of the first source language data, wherein the first source words are assigned a value that reflects the context of the word; translating, word for word, the mathematical representation of the first source language data into a first mathematical representation of a destination language, wherein a word in the first source language and a translated word in the destination language are assigned the same value; training a network, using the first mathematical representation of the destination language, to produce a hidden state that reflects the structure of the phrases in the first source language; providing destination language data, wherein the destination language data comprises a plurality of destination phrases and wherein each destination phrase comprises one or more destination words and wherein the plurality of destination phrases is larger than the first plurality of source phrases; producing a second mathematical representation of the destination language, wherein destination words are assigned a value that reflects the context of the word; training the network, using the second mathematical representation of the destination language, so that the hidden state additionally reflects the structure of the phrases in the destination language. In some embodiments, the training of the network further comprises providing second source language data, wherein the second source language data comprises a plurality of second source phrases and wherein each second source phrase comprises one or more second source words; producing a mathematical representation of the second source language data, wherein the second source words are assigned a value that reflects the context of the word; translating, word for word, the mathematical representation of the second source language data into a third mathematical representation of a destination language, wherein a word in the second source language and a translated word in the destination language are assigned the same value; training the network, using the third mathematical representation of the destination language, such that the hidden state additionally reflects the structure of the phrases in the second source language. In some embodiments, the natural language processing of the first aspect, described above, comprises a network training in accordance with the method described in accordance with the third aspect. In some embodiments, the control circuitry of the second aspect, described above, is further configured to use a network trained in accordance with the third aspect to perform the natural language processing.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which:

FIG. 1 shows an exemplary environment in which multilingual queries are received and handled, in accordance with some embodiments of the disclosure;

FIG. 2 shows another exemplary environment in which multilingual queries are received and handled, in accordance with some embodiments of the disclosure;

DETAILED DESCRIPTION

Figure 3:
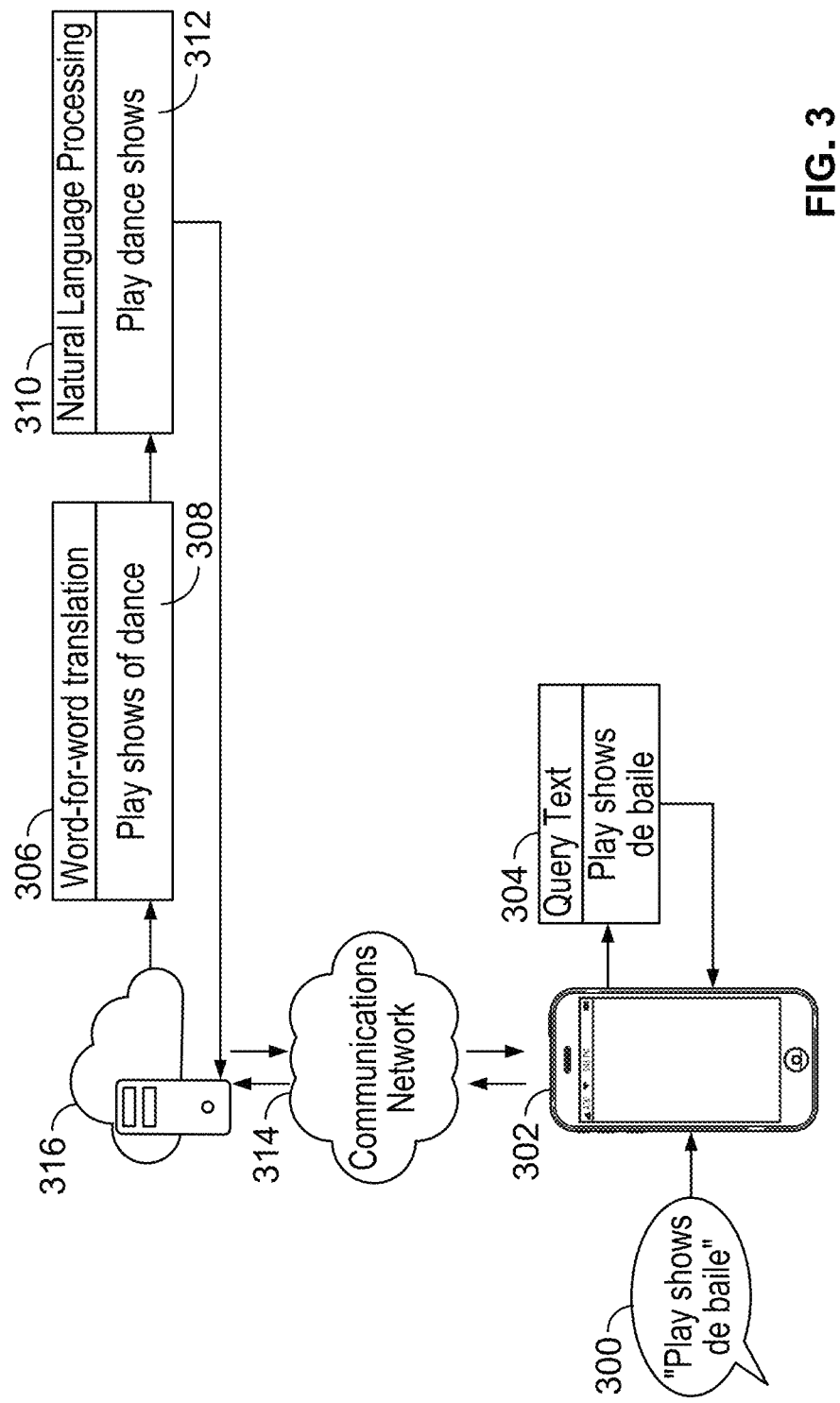
FIG. 3 shows a further exemplary environment in which multilingual queries are received and handled, in accordance with some embodiments of the disclosure.

Methods and systems are disclosed herein for handling a multilingual query comprising two or more languages. As referred to herein, a query is any input from the user and may be a voice query, a text query or a query comprising any other input form. A query may comprise a command, by which the user expects the computing device to perform a certain action (such as "play a movie"). A query may comprise a question, to which the user expects the computing device to provide an answer (such as "What is the tallest building in New York?"). As referred to herein, a multilingual query is a query that comprises at least two different languages. For example, a multilingual query may comprise two different languages, three different languages, four different languages or five different languages. The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

The methods and/or any instructions for performing any of the embodiments discussed herein may be encoded on computer-readable media. Computer readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

FIG. 1 shows an exemplary environment in which a query is interpreted. A multilingual query 100 is received at a computing device 102. At 104, the multilingual query 100 is converted at the computing device 102 into a format that the computing device 102 can process. For example, if the multilingual query 100 is a spoken query, the computing device 102 may comprise a microphone that converts raw audio data representing the voice query to a digital audio signal and the computing device 102 may use voice recognition software to convert the multilingual query 100 into a format that the computing device 102 can process. In another example, as discussed in connection with FIG. 4 below, the multilingual query 100 may be received from a voice-user interface that is separate from computing device 102.

Once the multilingual query 100 is in a format that the computing device 102 can process, the multilingual query 100 is translated word for word 106 at the computing device 102 into a monolingual query 108 comprising a destination language. Translating word for word 106 comprises determining the language of each word in the multilingual query 100 and subsequently translating each word into the destination language. The language recognition and subsequent translation of the words in the multilingual query may be performed by a dictionary lookup program, machine translation, a neural network model, a machine learning model and/or any other method known in the art. Translating word for word means that the word order of the multilingual query 100 and the monolingual query 108 are the same. For example, "Play shows de baile" is word for word translated into a destination language to produce a monolingual query 108 "Play shows of dance." The destination language is the language into which the multilingual query 100 is translated. In this example, it is English; however, any suitable language may be used. The destination language may be pre-set and/or may reflect the language of an operating system running on the computing device 102 and/or may be set by a user. How destination languages are made available is discussed in more detail below.

Once the monolingual query 108 has been produced, it is processed using natural language processing 110 at the computing device 102 to produce a natural language query 112 "Play dance shows." The processing may utilize a neural network that is trained to process a monolingual query and produce a natural language query. The neural network may comprise a hidden state based on the word order of the destination language. Ways of training a system to process a monolingual query using natural language processing are discussed below. The computing device 102 can use the natural language query 112 in any desired manner. For example, the computing device 102 may display the natural language query 112 to the user via a display, may play back the natural language query via a speaker and/or may process the natural language query to perform an action, such as displaying dance shows to the user.

FIG. 2 shows another exemplary environment in which a query is interpreted. In a similar manner, a multilingual query 200 is received at a computing device 202. The multilingual query 200 is converted 204 at the computing device 202 into a format that the computing device 202 can process. Once the multilingual query 200 is in a format that the computing device 202 can process, the multilingual query 200 is translated word for word 206 at the computing device 202 into a monolingual query 208 comprising a destination language. Once the monolingual query 208 has been produced, the computing device 204 transmits the monolingual query 208, via communications network 214, to server 216, where the monolingual query 208 is processed using natural language processing 210 to produce a natural language query 212 "Play dance shows." Computing device 202 receives the natural language query back from the server 216, again via the communications network 214. The computing device 202 can use the natural language query 212 in any desired manner. For example, the computing device 202 may display the natural language query 212 to the user via a display, may play back the natural language query via a speaker and/or may process the natural language query to perform an action, such as displaying dance shows to the user. The communications network 214 may be any suitable network, such as the internet, a local network and/or a wireless network.

FIG. 3 shows a further exemplary environment in which a query is interpreted. In a similar manner, a multilingual query 300 is received at a computing device 302. The multilingual query 300 is converted 304 at the computing device 302 into a format that the computing device 302 can process. Once the multilingual query 300 is in a format that the computing device 302 can process, the computing device 302 transmits the multilingual query 300, via communications network 314, to server 316, where the multilingual query 300 is translated word for word 306 into a monolingual query 308 comprising a destination language. Once the monolingual query 308 has been produced, the monolingual query 308 is processed, at the server 316, using natural language processing 310 to produce a natural language query 312 "Play dance shows." Computing device 302 receives the natural language query back from the server 316, again via the communications network 314. The computing device 302 can use the natural language query 312 in any desired manner. For example, the computing device 302 may display the natural language query 312 to the user via a display, may play back the natural language query via a speaker and/or may process the natural language query to perform an action, such as displaying dance shows to the user. The communications network 314 may be any suitable network, such as the internet, a local network and/or a wireless network.

Figure 4:
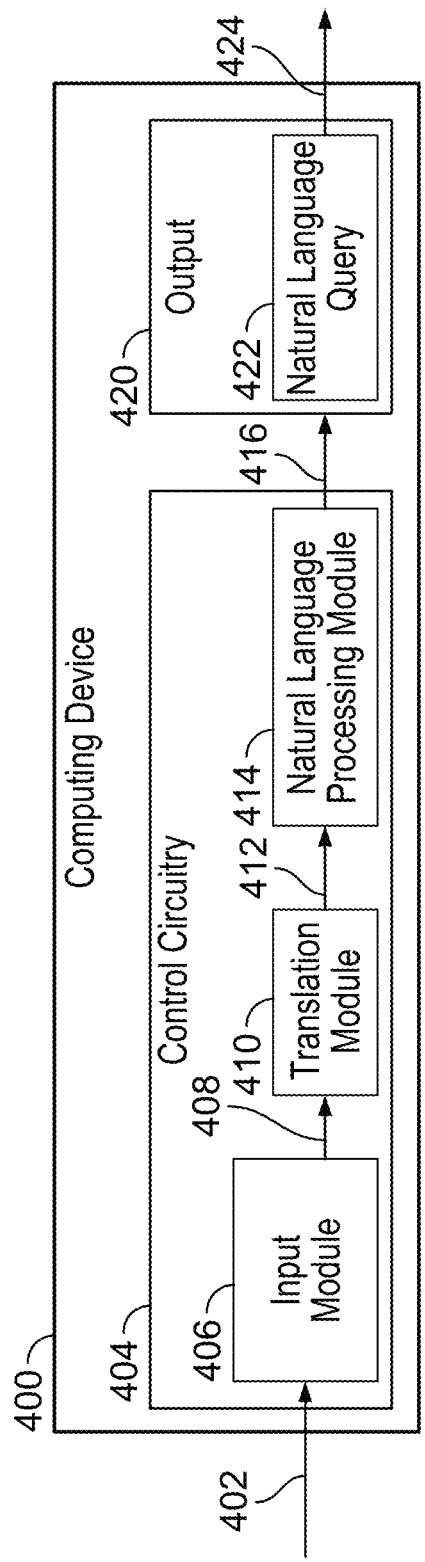
FIG. 4 is a block diagram representing components of a computing device and data flow therebetween for interpreting a multilingual query, in accordance with some embodiments of the disclosure.

FIG. 4 is a block diagram representing components of a computing device and data flow therebetween for interpreting a multilingual query, in accordance with some embodiments of the disclosure. Computing device 400 (e.g., a computing device 102, 202, 302 as discussed in connection with FIGS. 1-3) receives 402 a multilingual query.

The multilingual query may be received from a voice-user interface that is separate from computing device 400, such as a microphone, voice-enabled remote control, or other audio capture device. Transmission of the voice query to local device 400 may be accomplished using a wired connection, such as an audio cable, USB cable, ethernet cable or the like attached to a corresponding input port at local device 400, or may be accomplished using a wireless connection, such as BLUETOOTH, WiFi, WiMax, GSM, UTMS, CDMA, TDMA, 3G, 4G, 4G LTE, or any other suitable wireless transmission protocol. BLUETOOTH is a certification mark owned by Bluetooth SIG, Inc. The computing device 400 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, WiFi, WiMax, GSM, UTMS, CDMA, TDMA, 3G, 4G, 4G LTE, or other wireless transmission protocols.

Once received at the computing device 400, the query is transmitted to control circuitry 404. Control circuitry 404 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

Control circuitry 404 comprises an input module 406, a translation module 410 and a natural language processing module 414. The input module 406 receives 402 the multilingual query and converts it into a format that the translation module 410 and the natural language processing module 414 can process. The input module 406 may comprise audio conversion circuitry, natural language processing circuitry, or any other circuitry for interpreting voice queries, and may implement a local speech-to-text model. The local speech-to-text model may be a neural network model or machine learning model. The input module 406 may additionally or alternatively comprise circuitry for receiving and interpreting text input, such as for receiving keyboard commands. The text input may be in the form of a signal from a physical keyboard or a keyboard displayed on a screen. The input may also comprise user drawing symbols that are recognized by the computing device.

The translation module 410 receives 408 the converted multilingual query from the input module 406. The translation module 410 translates word for word the multilingual query into a monolingual query comprising a destination language. Translating word for word comprises determining the language of each word in the multilingual query and subsequently translating each word into the destination language. The language recognition and subsequent translation of the words in the multilingual query may be performed by a dictionary lookup program, a machine translation, a neural network model, a machine learning model and/or any other method known in the art. Translating word for word means that the word order of the multilingual query and the monolingual query are the same.

The natural language processing module 414 receives 412 the monolingual query from the translation module 410. The natural language processing module 414 processes the monolingual query into a natural language query. The processing may utilize a neural network that is implemented in the control circuitry and that is trained to process a monolingual query and produce a natural language query. The neural network may comprise a hidden state based on the word order of the destination language.

In a similar manner to the exemplary environments discussed in connection with FIGS. 2 and 3 above, the translation module and/or the natural language processing module may be implemented on a server remote to the computing device. For an embodiment wherein the natural language processing module is implemented on a server remote to the computing device, the computing device further comprises circuitry that enables the monolingual query that is output from the translation module to be transmitted, via a communications network, to the server. The server receives the monolingual query from the computing device, processes the monolingual query with the natural processing module, and transmits the resulting natural language query back to the computing device. In a similar manner, for an embodiment wherein the translation module and the natural language processing module are implemented on a server remote to the computing device, the computing device further comprises circuitry that enables the multilingual query that is output from the input module to be transmitted, via a communications network, to the server. The server receives the multilingual query from the computing device, processes the monolingual query with the translation module and the natural processing module, and transmits the resulting natural language query back to the computing device.

The output module 420 receives 416 the natural language query from the natural language processing module 414. The output module 420 may process the natural language query 422 in any desired manner. The output module may process the natural language query 422 so that it can be outputted via output port 424 and displayed to the user via a display and/or so that it can be played back via a speaker and/or so that it can be used to perform an action, such as displaying dance shows to the user on a screen.

Figure 5:
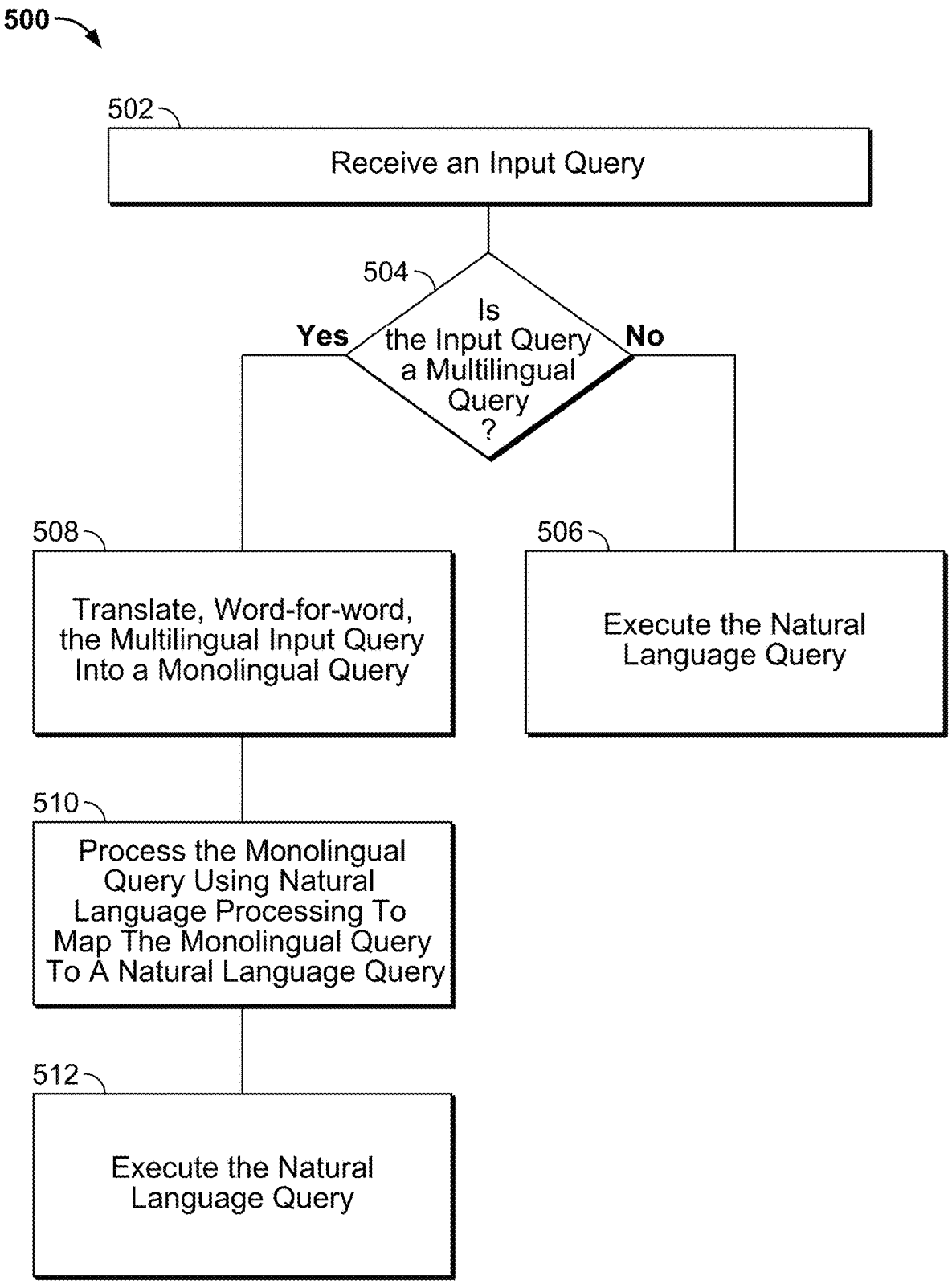
FIG. 5 is a flowchart representing a process for handling a multilingual query, in accordance with some embodiments of the disclosure.

FIG. 5 is a flowchart representing an illustrative process 500 for handling a multilingual query, in accordance with some embodiments of the disclosure. Process 500 may be implemented on any aforementioned computing device 102, 202, 302, 400. In addition, one or more actions of process 500 may be incorporated into or combined with one or more actions of any other process or embodiment described herein.

At 502, computing device 102, 202, 302, 400 receives an input query. The input query may be a voice query or a text query. In the case of a voice query, the voice query may be received as an analog signal from a microphone, or as a digital audio signal. The digital audio signal may be raw audio data, or it may be compressed, filtered, or encoded using any suitable audio compression or encoding format. In the case of a text query, the input may be in the form of a signal from a physical keyboard or a keyboard displayed on a screen. The input may also comprise a user's drawing symbols that are recognized by the computing device 102, 202, 302, 400.

At 504, the computing device 102, 202, 302, 400 determines whether the input query is a multilingual query (for example, a query comprising words from two or more different languages). Alternatively, the computing device 102, 202, 302, 400 may send the query to a server via a communications network, and this step may take place on a server. The server may then send the result of the determining back to the computing device 102, 202, 302, 400 or alternatively continue to perform the steps illustrated in the flowchart. If the query comprises a single language ("No" at 504), the computing device 102, 202, 302, 400 executes the single language query at 506. Alternatively, the computing device 102, 202, 302, 400 may send the single language query to a server via a communications network and this step may take place on a server. The sever may then send the result of the executing back to the computing device 102, 202, 302, 400. The single language query at 506 can also be referred to as a natural language query as it typically comprises a word order that is usually encountered in the single language. If the query comprises two or more languages ("Yes" at 504), the computing device translates, word for word, the multilingual input query into a monolingual query at 508. Alternatively, the computing device

102, 202, 302, 400 may send the multilingual query to a server via a communications network and this step may take place on a server. The sever may then send the result of the translating back to the computing device 102, 202, 302, 400 or alternatively continue to perform the steps illustrated in the flowchart. Translating word for word comprises determining the language of each word in the multilingual query and subsequently translating each word into the destination language. The language recognition and subsequent translation of the words in the multilingual query may be performed by a dictionary look-up program, machine translation, a neural network model, a machine learning model and/or any other method known in the art. Translating word for word means that the word order of the multilingual query and the monolingual query are the same At 510, the computing device 102, 202, 302, 400 processes the monolingual query, using natural language processing, to map the monolingual query to a natural language query. Alternatively, the computing device 102, 202, 302, 400 may send the multilingual query to a server via a communications network and this step may take place on a server. The sever may then send the result of the processing back to the computing device 102, 202, 302, 400 or alternatively also perform step 512. The processing may utilize a neural network implemented in the control circuitry and that is trained to process a monolingual query and produce a natural language query. The neural network may comprise a hidden state based on the word order of the destination language.

At 512, the computing device 102, 202, 302, 400 executes natural language query. Alternatively, the computing device 102, 202, 302, 400 may send the natural language query to a server via a communications network and this step may take place on a server. The sever may then send the result of the executing back to the computing device 102, 202, 302, 400. The natural language query may be processed in any desired manner. The natural language query may be processed so that it can be displayed to the user via a display and/or so that it can be played back via a speaker and/or so that it can be used to perform an action, such as displaying dance shows to the user on a screen.

Figure 6:
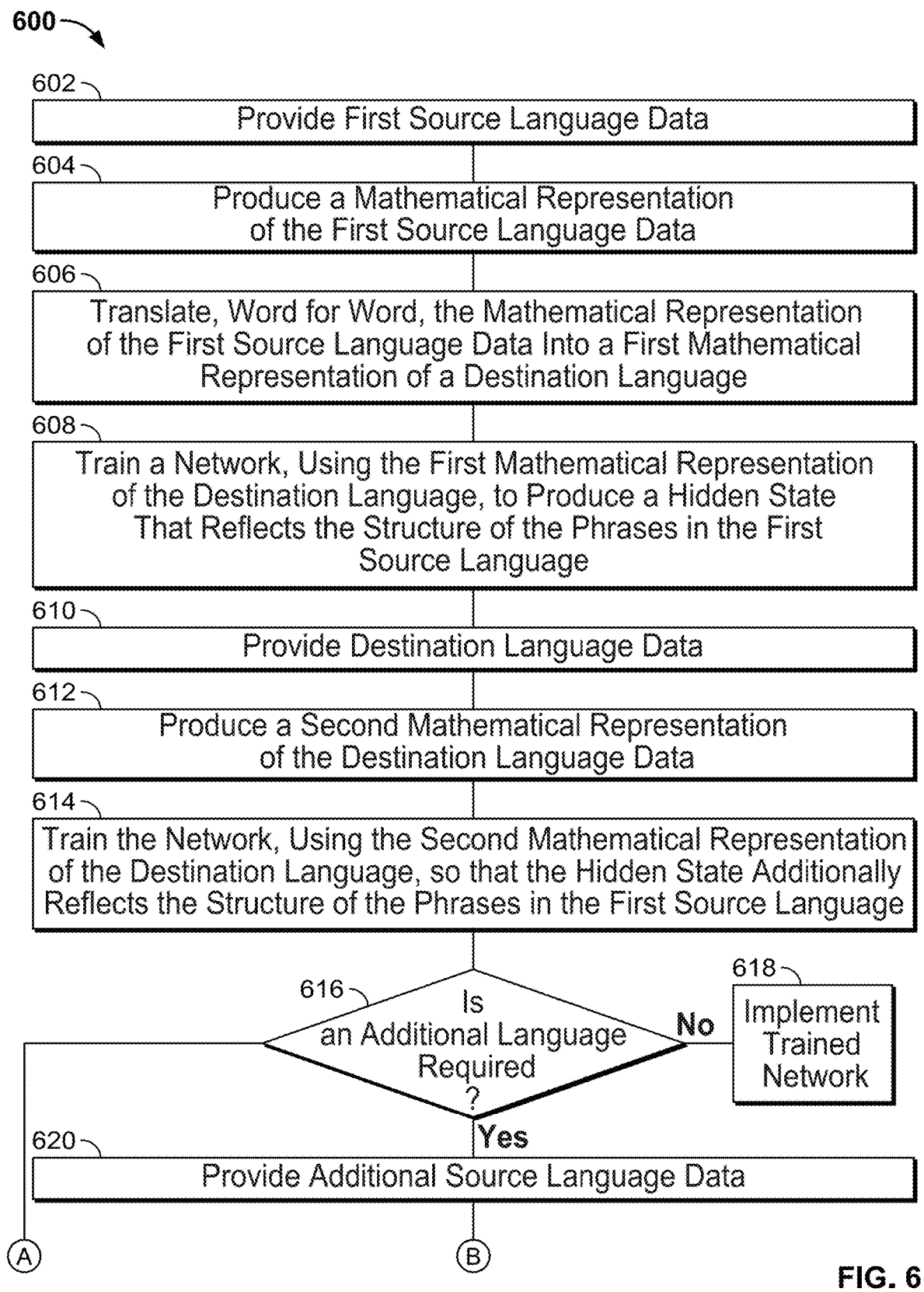
FIG. 6 is a flowchart representing a process for training a system to handle a multilingual query, in accordance with some embodiments of the disclosure.
Figure 6:
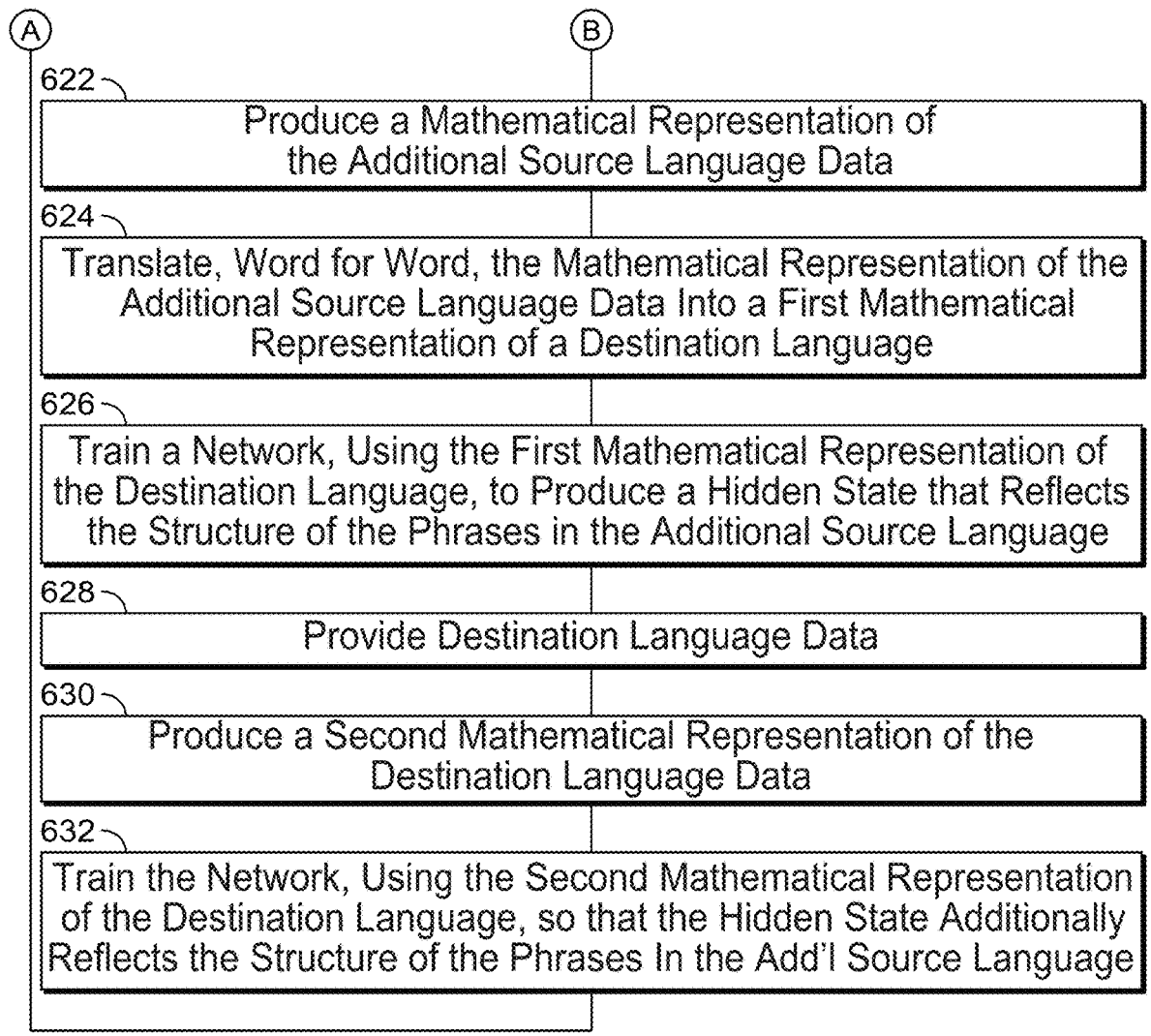

FIG. 6 is a flowchart representing a process 600 for training a system to handle a multilingual query, in accordance with some embodiment of the disclosure. Process 600 is typically used to train a network, such as a neural network. Such a network may be trained and/or inferred on a computing device. In addition, one or more actions of process 600 may be incorporated into or combined with one or more actions of any other process or embodiment described herein.

At 602, first source language data (for example, one of the languages that would typically make up a multilingual query) is provided to the computing device. The first source language data is typically a monolingual corpus comprising a plurality of structured texts in the source language.

At 604, the computing device produces a mathematical representation of the first source language data. Typically producing a mathematical representation of the first source language data comprises building a first source language vector based on the first source language data. In an example, the first source language may be Spanish and the first source language vector represents the relationships typically found between words in Spanish, based on a monolingual Spanish corpus.

At 606, the computing device translates word-for-word the mathematical representation of the first source language data into a first mathematical representation of a destination language. Typically, this translation is performed using models such as Word2vec. The result of this word-for-word translation is typically a first destination language vector that refers to words in the destination language but reflects the structure of the source language vector.

At 608, the computing device trains a network, using the first mathematical representation of the destination language, to produce a hidden state that reflects the structure of the phrases in the first source language. Typically, the first destination language vector is used as an input into an encoder-decoder network, such as a Bi-directional Long Short Term Memory (Bi-LSTM) network. The encoder-decoder network produces a hidden state via unsupervised learning.

At 610, destination language data (for example, the language the multilingual query is translated into) is provided to the computing device. The destination language data is typically a monolingual corpus comprising a plurality of structured texts in the destination language.

At 612, the computing device produces a second mathematical representation of the destination language data. This step may be performed before, sequentially, or in parallel to the previous steps. Typically, producing the second mathematical representation of the destination language data comprises building a second destination language vector based on the destination language data. In an example, the destination language may be English, and the second destination language vector represents the relationships typically found between words in English, based on a monolingual English corpus. Typically, the destination language corpus is larger than the source language corpus.

At 614, the computing device trains the network, using the second mathematical representation of the destination language, so that the hidden state additionally reflects the structure of the phrases in the destination language. Typically, the first destination language vector is used as an input into an encoder-decoder network, such as a Bi-LSTM network. The encoder-decoder network produces a hidden state via unsupervised learning. Such a hidden state reflects the source language and the destination language in one common space, thereby enabling the translation of a query comprising the source language and the destination language when implemented in a suitable device.

At 616, the computing device determines whether an additional language is required. Typically, this will be indicated by a user who is training the network. At 618 ("No" at 616) the trained network is implemented in one or more further computing devices, such as computing devices 102, 202, 302, 400 as discussed above. As discussed above, the computing device 102, 202, 302, 400 receives a multilingual query, translates the query word for word into a monolingual query and uses the trained network to process the monolingual query and produce a natural language query.

At 620 ("Yes" at 616), additional source language data (for example one of the languages that would typically make up a multilingual query) is provided to the computing device. For each "loop," this additional source language data is different from the previous "loops." The additional source language data is typically a monolingual corpus comprising a plurality of structured texts in the additional language.

At 622, the computing device produces a mathematical representation of the additional source language data. Typically, producing a mathematical representation of the additional source language data comprises building an additional source language vector based on the additional language data. In an example, the additional source language may be French, and the additional source language vector represents the relationships typically found between words in French, based on a monolingual French corpus.

At 624, the computing device translates word for word the mathematical representation of the additional source language data into an additional first mathematical representation of the destination language, in a similar manner described in connection with 606.

At 626, the computing device trains a network, using the additional first mathematical representation of the destination language, to produce a hidden state that reflects the structure of the phrases in the additional source language. Typically, the additional first destination language vector is used as an input into an encoder-decoder network, such as a Bi-LSTM network. The encoder-decoder network produces a hidden state via unsupervised learning.

Optionally, at 628, destination language data (for example the language the multilingual query is translated into) is provided to the computing device. The destination language data is typically a monolingual corpus comprising a plurality of structured texts in the destination language.

Optionally, at 630, the computing device produces an additional second mathematical representation of the destination language data. This step may be performed before, sequentially, or in parallel to the previous steps. Typically, producing the additional second mathematical representation of the destination language data comprises building an additional second destination language vector based on the destination language data. In an example, the destination language may be English, and the second destination language vector represents the relationships typically found between words in English, based on a monolingual English corpus. Typically, the destination language corpus is larger than the additional source language corpus.

At 632, the computing device trains the network, using the additional second mathematical representation of the destination language, so that the hidden state additionally reflects the structure of the phrases in the destination language. Typically, the first destination language vector is used as an input into an encoder-decoder network, such as a Bi-LSTM network. The encoder-decoder network produces a hidden state via unsupervised learning. As an alternative to performing steps 628 and 630, the second mathematical representation of the destination language data produced at step 612 is used to train the network at this stage. Such a hidden state reflects the source language, the additional source and the destination language in one common space, thereby enabling the translation of a query comprising two of the source language, the additional source language and the destination language or a query comprising all three languages when implemented in a suitable device.

At 616, the computer again determines whether any additional languages are required. If an additional language is required, steps 620-632 are repeated with the additional language, and the hidden state reflects the structure of the additional language.

In order to improve the accuracy of the network, the network may additionally be trained on sentences/vectors with added noise, such as the addition or removal of words.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for handling a multilingual query comprising two or more languages, the method comprising:
    receiving, at a computing device, an input;
    determining that the input comprises a multilingual query comprising at least a first source language and a second source language;
    converting the input into a format that the computing device can process;
    determining, for each word in the received query, a language of the word;
    identifying a language of an operating system running on the computing device;
    selecting, based on the identified language of the operating system, a destination language;
    translating, word for word, the multilingual query into the destination language to produce a monolingual query, wherein the translating is based on the determined language for each word in the received query and the word order of the multilingual query and the word order of the monolingual query are the same;
    identifying a trained network that has been trained on the first source language and the second source language;
    processing the monolingual query using natural language processing to map the monolingual query to a natural language query in the destination language, wherein the natural language processing of the monolingual query utilizes the trained network;
    identifying, based on the natural language query, a content item; and
    generating for output, at the computing device, the content item.

2. The method of claim 1, wherein at least one of the translating or the processing using natural language processing is performed at the computing device.

3. The method of claim 1, wherein:
    the computing device communicates with a server, and
    wherein the server performs at least one of the translating or the processing using natural language processing.

4. The method of claim 1, wherein the natural language processing utilizes a trained network that comprises a hidden state based on word order of the destination language.

5. The method of claim 1, wherein the computing device is configured to receive spoken input or text input.

6. The method of claim 1, wherein the determining the language of each word of a query is performed by one of a machine learning model or a neural network model.

7. The method of claim 1, wherein identifying the destination language further comprises:
    accessing a user profile; and
    identifying, via the user profile, a user setting for a destination language.

8. A system for handling a multilingual query comprising two or more languages, the system comprising:
    a communications port; and
    control circuitry communicatively coupled to the communications port and configured to:
        receive an input via the communications port;

determine that the input comprises a multilingual query comprising at least a first source language and a second source language;

convert the input into a format that the computing device can process;

determine, for each word in the received query, a language of the word;

identify a language of an operating system running on the computing device;

select, based on the identified language of the operating system, a destination language;

translate, word for word, the multilingual query into the destination language to produce a monolingual query, wherein the translating is based on the determined language for each word in the received query and the word order of the multilingual query and the word order of the monolingual query are the same;

identify a trained network that has been trained on the first source language and the second source language;

process the monolingual query using natural language processing to map the monolingual query to a natural language query in the destination language, wherein the natural language processing of the monolingual query utilizes the trained network;

identify, based on the natural language query, a content item; and generate for output, at the computing device, the content item.

9. The system of claim 8, wherein the control circuitry is further configured to perform at least one of the translating and/or the processing using natural language processing at the control circuitry.

10. The system of claim 8, wherein the control circuitry is further configured to:

enable the control circuitry to communicate with a server that performs at least one of the translating and/or the processing using natural language processing.

11. The system of claim 8, wherein the control circuitry is further configured to use natural language processing that utilizes a trained network that comprises a hidden state based on word order of the destination language.

12. The system of claim 8, wherein the control circuitry is further configured to receive spoken input or text input.

13. The system of claim 8, wherein the control circuitry configured to determine the language of each word of a query is further configured to determine the language by one of a machine learning model or a neural network model.

14. The system of claim 8, wherein the control circuitry configured to identify the destination language is further configured to:

access a user profile; and identify, via the user profile, a user setting for a destination language.

15. A non-transitory computer-readable medium having instructions encoded thereon that when executed by control circuitry cause the control circuitry to:

receive an input;

determine that the input comprises a multilingual query comprising at least a first source language and a second source language;

convert the input into a format that the computing device can process;

determine, for each word in the received query, a language of the word;

identify a language of an operating system running on the computing device;

select, based on the identified language of the operating system, a destination language;

translate, word for word, the multilingual query into the destination language to produce a monolingual query, wherein the translating is based on the determined language for each word in the received query and the word order of the multilingual query and the word order of the monolingual query are the same;

identify a trained network that has been trained on the first source language and the second source language;

process the monolingual query using natural language processing to map the monolingual query to a natural language query in the destination language, wherein the natural language processing of the monolingual query utilizes the trained network;

identify, based on the natural language query, a content item; and generate for output, at the computing device, the content item.

16. The non-transitory computer-readable medium of claim 15, wherein execution of the instructions to handle a multilingual query comprising two or more languages further causes the control circuitry to execute the natural language query at the control circuitry.

17. The non-transitory computer-readable medium of claim 15, wherein execution of the instructions to handle a multilingual query comprising two or more languages further causes the control circuitry to perform at least one of the translating and/or the processing using natural language processing at the control circuitry.

18. The non-transitory computer-readable medium of claim 15, wherein execution of the instructions to handle a multilingual query comprising two or more languages further causes the control circuitry to enable the control circuitry to communicate with a server that performs at least one of the translating and/or the processing using natural language processing.

* * * * *